Oct. 16, 1945.  P. L. SPENCER  2,386,820
METHOD OF FORMING SEALS
Filed Dec. 22, 1941

Inventor:
Percy L. Spencer
by Elmer J. Gorn
Attorney

Patented Oct. 16, 1945

2,386,820

UNITED STATES PATENT OFFICE 2,386,820

METHOD OF FORMING SEALS

Percy L. Spencer, West Newton, Mass., assignor to Raytheon Manufacturing Company, Newton, Mass., a corporation of Delaware Application December 22, 1941, Serial No. 423,985

3 Claims. (Cl. 49—81)

This invention relates to a method of sealing a vitreous substance to a conductor. More particularly this invention relates to the forming of such seals designed for use in electrical discharge devices.

When sealing a vitreous substance to a conductor in air by the use of a flame various compounds such as oxides are formed. These compounds, which may be difficult if not impossible to remove, oftentimes interfere with the desired operation of the electrical discharge devices. This is particularly true when ultra-high frequency currents are employed in such discharge devices. Where the vitreous substance is a glass of specific characteristics especially selected for the designated purpose, such as a glass having a high dielectric constant for use in electrical discharge devices employed in ultra-high frequency circuits, these characteristics will be altered by using a flame to seal the glass to the conductor. In addition, sealing under these conditions may cause deformation of the glass and undesirable evaporation from the conductor.

An object of this invention is to provide a method for sealing a vitreous substance to a conductor without deformation thereof or the formation of deleterious compounds.

Another object of this invention is to provide a method for sealing a vitreous substance to a conductor in which whatever deleterious compounds are formed may be readily removed.

A further object of this invention is the provision of a method of sealing a vitreous substance to a conductor without changing the electrical characteristics of the vitreous substance.

A still further object of the present invention is the provision of such a method which will not cause any substantial deformation of the vitreous substance.

Figure 1:
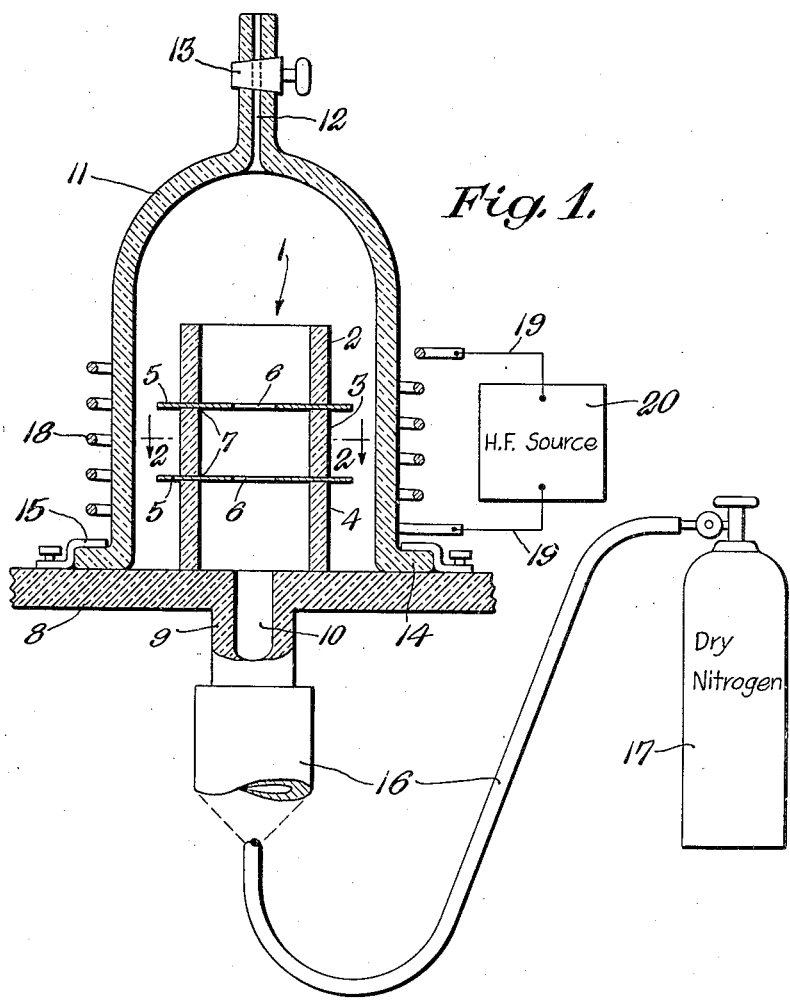
Figure 2:
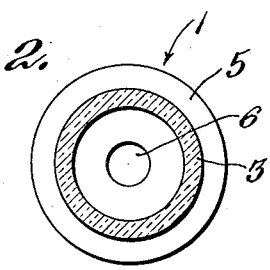

Other objects and advantages of this invention will become apparent and the hereinbefore objects will be best understood from the following description of an exemplification thereof, reference being had to the accompanying drawing, wherein:

Fig. 1 is a view, partly diagrammatic and partly in vertical section of an apparatus and an electrode lead assembly in which my novel process may be carried out; and Fig. 2 is a view of the electrode lead assembly taken along the line 2—2 of Fig. 1.

The electrode lead assembly 1 consists of three short glass tubes 2, 3, and 4 with a pair of conductors, such as copper discs 5, arranged therebetween, as shown in Fig. 1. Each of said copper discs 5 is provided with a central opening 6 therein. These openings are aligned when the electrode lead assembly is made, to thereby provide a straight passage through the assembly. Seals 7 are to be formed where the glass and copper discs abut. Tube 3 preferably is made of a glass having a high dielectric constant. Tubes 2 and 4 are all preferably made of a borosilicate glass.

In the process of making the seals I prefer to arrange the electrode lead assembly 1 on a supporting platform 8, of a non-conducting material, having a tubulation 9 formed therein with an opening 10 therein to provide means for the passage of a gas through the platform 8. I prefer to arrange the electrode lead assembly so that the openings 6 of the copper disc are directly over the opening 10 of the platform 8.

A bell jar 11 is arranged over the electrode lead assembly 1 and rests on platform 8. The bell jar is provided at the top thereof with an orifice 12 for the escape of gas therefrom. A stopcock 13 is arranged in the orifice. In order to secure the bell jar 11 firmly to the platform 8 I prefer to provide an annular flange 14 at the bottom of said jar and clamps 15 which are secured to the platform 8 and each having a portion thereof arranged over the flange 14.

One end of a hose 16 is arranged over the tubulation 9 and the other end of said hose is connected to a tank 17 of a suitable gas, such as dry nitrogen. The gas selected should preferably have the following characteristics: it should preferably have a relatively low heat conductivity, a heat conductivity of the order of nitrogen or lower being satisfactory. In addition the selective gas should be preferably relatively inert and at the pressures and temperatures developed during the practice of this method should only form compounds that can be readily removed from the electrode lead assembly. Dry nitrogen has been found to be a suitable gas since it has a relatively low heat conductivity and any compounds formed with the copper of the copper discs 5 are readily removable.

With the stopcock 13 open the nitrogen is introduced through the opening 10 into the bell jar. A stream of nitrogen passes through the opening 6 and through the bell jar and forces the air in the bell jar out through the orifice 12. The stopcock 13 is then closed and the pressure of the nitrogen atmosphere within the bell jar is raised until it is preferably several pounds above atmospheric pressure.

The pressure chosen depends on the nature of the conductor and should be sufficiently high to prevent any substantial evaporation of the conductor substance at the temperatures developed during the practice of the method of this invention. It should be sufficiently high so as to permit the conductor to be heated to a temperature sufficient to cause fusion of the vitreous member.

After the desired pressure is reached a high frequency coil 18 which is arranged around the bell jar is connected by suitable conductors 19 to a source of high frequency current 20. By high frequency as used here I mean a frequency sufficiently high so as to induce an adequate heating current in the discs 5 without the necessity of employing an iron core. The high frequency current 20 passing through the coil 18 induces a current in copper disc 5 causing the temperature of said discs to be raised to a point at which the glass touching the discs fuses. Since the gas selected has relatively low heat conductivity, portions of the glass not immediately contiguous to the discs will not be melted nor will the shape of the glass be deformed. While I have described the temperature as being raised to a point sufficient to cause fusion of the glass abutting the disc it is of course to be understood that as much glass may be fused as is found desirable.

After the desired fusion has occurred the high frequency current is shut off and the electrode lead assembly permitted to cool. It is preferred that the electrode lead assembly cool off within the nitrogen atmosphere until such time as it has reached a temperature where exposure to the air will not affect it. The electrode lead assembly may thereafter be removed from the bell jar 11 and any nitrides formed during the hereinbefore described process may be removed by any suitable means. For example, the electrode lead assembly may be cleaned with ammonium carbonate. Another method of cleaning off the nitride compounds from the electrode lead assembly is to first immerse said assembly in a dilute solution of sulphuric acid and thereafter in a dilute solution of chromic acid. Various other means of cleaning the assembly will readily suggest themselves to any one versed in the art.

While I have described the specific details of this exemplification of my invention it is apparent that these details may be varied without departing from the spirit thereof. Other gases for example argon, having the specified characteristics may be used in place of nitrogen. Other vitreous and conducting materials may be employed instead of those specifically herein set forth. Other seals between the vitreous substance and the conductor may be formed.

Various other ideas as to the utilizing of various aspects of my invention will readily suggest themselves to those skilled in the art.

What is claimed is:

1. The method of sealing a vitreous member to a conductor comprising arranging said vitreous member and said conductor in juxtaposition in an atmosphere of nitrogen, said atmosphere having a pressure of the order of several pounds per square inch above atmospheric pressure, and generating heat in said conductor to heat said parts to sealing temperature while subjected to said pressure of nitrogen.

2. The method of sealing a vitreous member to a conductor comprising arranging said vitreous member and said conductor in juxtaposition in an atmosphere of a gas having a heat conductiivty of the order of nitrogen or lower, said atmosphere having a pressure of the order of several pounds per square inch above atmospheric pressure, and generating heat in said conductor to heat said parts to sealing temperature while subjected to said pressure of gas.

3. The method of sealing a vitreous member to a copper conductor comprising arranging said vitreous member and said copper conductor in juxtaposition in an atmosphere of nitrogen, said atmosphere having a pressure of the order of several pounds per square inch above atmospheric pressure, and generating heat in said conductor to heat said parts to sealing temperature while subjected to said pressure of nitrogen.

PERCY L. SPENCER.